United States Patent [19]
Nausedas

[11] Patent Number: 4,674,153
[45] Date of Patent: Jun. 23, 1987

[54] METHOD OF MAKING A SHIRRED CASING STICK HAVING AN IMPLANTED END CLOSURE

[75] Inventor: Joseph A. Nausedas, Oak Forest, Ill.

[73] Assignee: Viskase Corporation, Chicago, Ill.

[21] Appl. No.: 832,725

[22] Filed: Feb. 25, 1986

Related U.S. Application Data

[62] Division of Ser. No. 490,966, May 2, 1983, Pat. No. 4,585,680.

[51] Int. Cl.$^4$ .............................................. A22C 21/00
[52] U.S. Cl. ........................................ 17/49; 17/42; 426/138; 493/308; 493/962
[58] Field of Search ............... 493/121, 156, 186, 267, 493/308, 394, 962; 426/135, 138, 140, 105; 17/41, 42, 49, 1 R; 428/36; 138/118.1

[56] References Cited

U.S. PATENT DOCUMENTS

| | | | |
|---|---|---|---|
| 3,162,893 | 12/1964 | Townsend | 17/34 |
| 3,274,005 | 9/1966 | Alsys | 426/140 |
| 3,383,222 | 5/1968 | Alsys et al. | 383/120 |
| 3,550,191 | 12/1970 | Matecki | 17/49 |
| 3,882,252 | 5/1975 | Winkler | 426/140 |
| 3,892,869 | 7/1975 | Sheridan et al. | 426/138 |
| 3,914,447 | 10/1975 | Tums et al. | 426/390 |
| 3,942,568 | 3/1976 | Stemmler | 383/120 |
| 3,942,569 | 3/1976 | Becker et al. | 383/120 |
| 3,971,301 | 7/1976 | Becker et al. | 17/49 |
| 4,075,938 | 2/1978 | Martinek | 493/121 |
| 4,162,693 | 7/1979 | Beckman | 138/118.1 |
| 4,273,551 | 6/1981 | Kostner et al. | 493/243 |
| 4,411,048 | 10/1983 | Green | 17/49 |
| 4,428,402 | 1/1984 | Kubo et al. | 138/118.1 |
| 4,525,984 | 7/1985 | Kollross | 53/483 |
| 4,551,370 | 11/1985 | Nausedas | 428/36 |

FOREIGN PATENT DOCUMENTS 114397 8/1984 European Pat. Off. .
1439520 6/1976 United Kingdom .

Primary Examiner—Frederick R. Schmidt
Assistant Examiner—William E. Terrell
Attorney, Agent, or Firm—Roger Aceto

[57] ABSTRACT

A shirred casing stick article, and method of manufacture thereof, having an implanted end closure positioned in the stick bore, or in a support tube within the casing stick, such that the closure is axially displaced away from the first-to-be-stuffed end of the casing stick.

6 Claims, 11 Drawing Figures

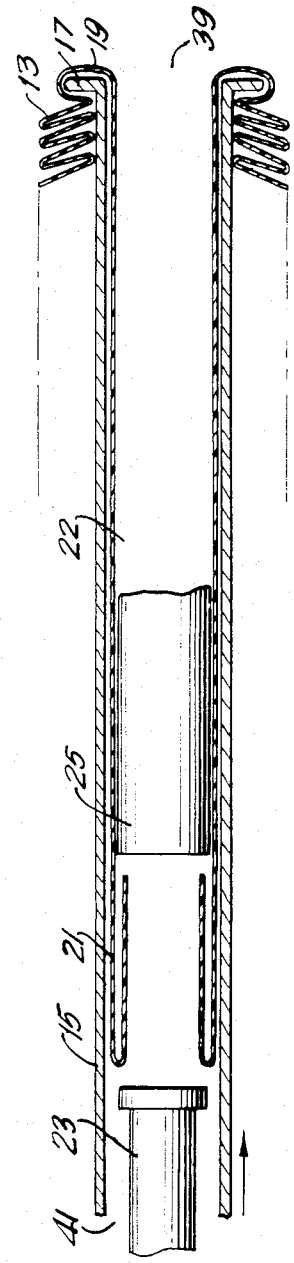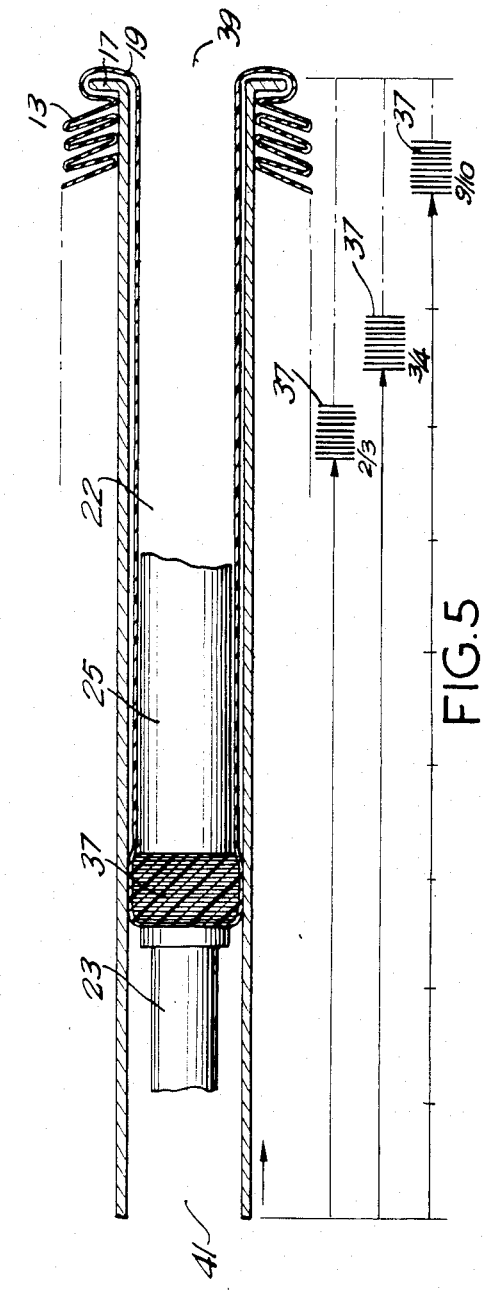
FIG.4
FIG.5

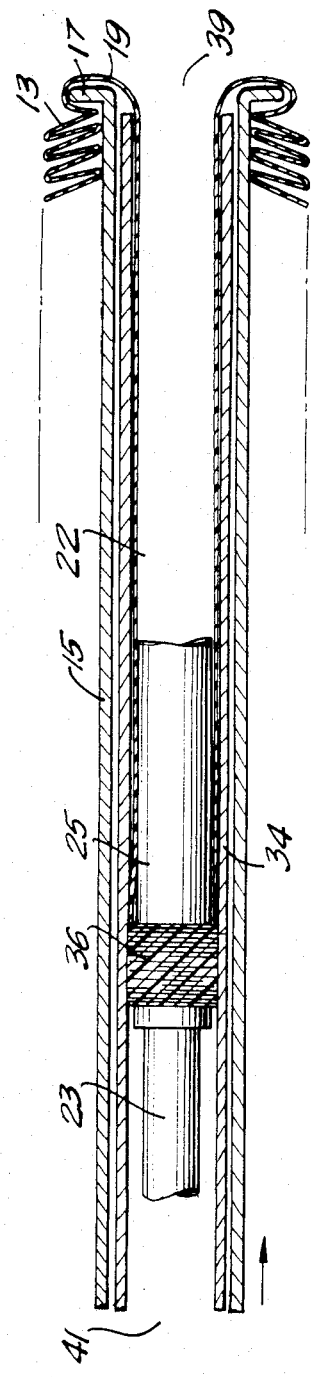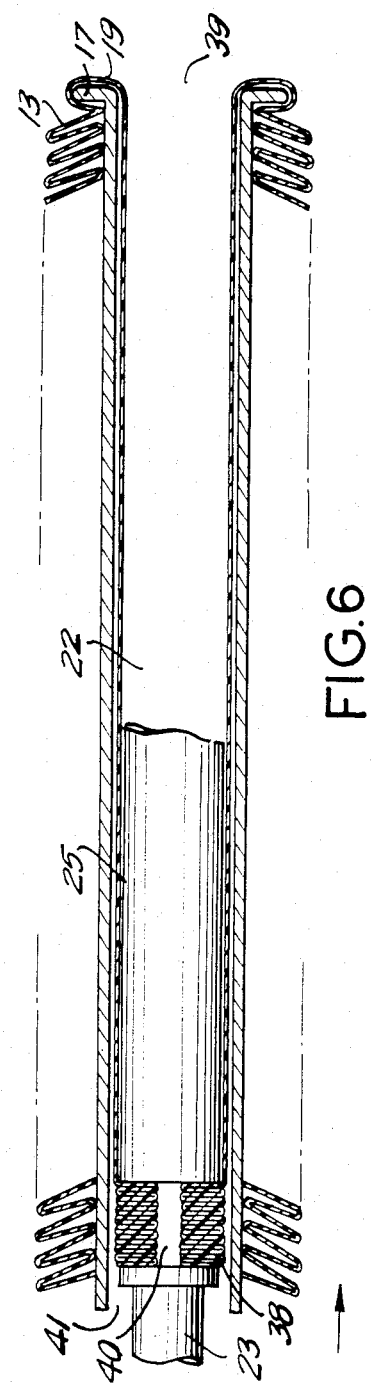

METHOD OF MAKING A SHIRRED CASING STICK HAVING AN IMPLANTED END CLOSURE

This application is a division of prior U.S. application Ser. No. 490,966 Filing Date May 2, 1983 U.S. Pat. No. 4,585,680.

FIELD OF THE INVENTION

The present invention relates to a shirred stick casing article including an end closure of casing material and to methods and apparatus for making such an article. More particularly, the invention relates to a casing article with an implanted closure forming a plug of casing or other material positioned in the stick bore or in a support tube within the casing stick such that the closure is axially displaced away from the first-to-be-stuffed end of the stick.

BACKGROUND OF THE INVENTION

Shirred food casings of flexible tubing are commonly used in the food industry for making and processing various encased food products such as frankfurters, sausages, or the like. Consequently, shirred casings, the methods of making the casing materials, casing shirring methods, shirred tubular casing articles or "sticks", and the apparatus and methods relating to the use of the shirred casing to produce a stuffed food product, are all well known in the art. For example, a shirred casing, a shirring method and apparatus are described generally in U.S. Pat. No. 2,984,574. U.S. Pat. No. 3,115,668 describes a machine for stuffing a shirred casing stick to make linked sausages or frankfurters.

The advent of automatic machines for stuffing and/or linking of shirred food casings as described, for example, in Townsend U.S. Pat. No. 3,115,668, has greatly increased the production rate of sausage type products. In an automated stuffing operation, as described in the Townsend Patent, hollow shirred casing sticks are fed automatically and rapidly onto the stuffing horn of the stuffing machine. The horn axially picks up the stick by extending through the bore of the hollow stick to the fore end of the stick. The horn then advances the stick into a chuck. The chuck grips the fore end of the stick and rotates the stick about the horn during the stuffing operation to link the stuffed casing.

In order for the horn to advance the stick into the chuck, the bore of the stick at the fore end must be plugged. With the bore plugged in this fashion, the stuffing horn can push on the plug from inside the stick until the fore end is firmly gripped by the chuck. The stuffing horn continues to advance into the chuck, and this moves the plug out of the bore of the shirred stick and deshirrs a portion of the casing from either the fore end of the stick or from the plug at the start of the stuffing cycle.

Another function of the plug is that it seals the casing end to block flow of the emulsion being stuffed in the initial stage of the stuffing operation and prior to the formation of the first link. In this respect, emulsion forces the casing of the plug into the linker so that flow of the emulsion out of the casing is restricted until the first link is formed yet the emulsion is easily strippable in a subsequent operation as described hereinbelow.

Providing a casing stick having a plug or closure formed at one end, generally, can be more uniformly and economically accomplished during the manufacturing of the shirred casing stick than during use of the casing. To this end, various types of casing closures and methods for forming such closures are known in the art. For example, Townsend, U.S. Pat. No. 3,162,893, discloses a casing end closer which engages the terminal end pleats of the shirred casing and rotates to twist the casing tightly upon itself to form, as Townsend describes, a closure "having a knot-like neck". Other end closures are formed by pinching and twisting end pleats of the casing as in U.S. Pat. No. 3,882,252 and Canadian Pat. No. 813,838. End closures can also be formed within the hollow stick or formed outside the stick and subsequently inturned or implanted within the stick. For example, Alsys, U.S. Pat. No. 3,274,005 discloses a shirred casing having an end which is twisted closed outside the hollow stick and then pulled into a position within the bore of the shirred casing. A second Alsys Patent U.S. Pat. No. 3,383,222 discloses a shirred casing having a compressed plug end closure implanted in the fore end of the stick. Here the plug is formed by pulling a strand of the casing laterally across the bore of the stick to form a blind, inturning the strand into the end of the casing stick and then forming the inturned strand into a plug by axially compressing the inturned strand against a fixed surface with a plunger inserted into the other end of the casing stick. Because the formation of the blind in this patent involves the asymmetrical stretching of unshirred casing across the bore of the stick, the resulting plug is asymmetrical relative to the axis of the stick bore.

In U.S. Patents to Tums, U.S. Pat. Nos. 3,865,954, 3,914,447 and 4,070,729 there are disclosed, respectively, a hollow casing stick having an end closure, a method, and a device for forming the end closure, wherein the closure is a progressively twisted, close packed knot implanted within the bore of the shirred stick. The Tums closure is formed by twisting terminal pleats of the shirred stick about a rod inserted within the bore of the shirred stick. Sheridan et al., U.S. Pat. No. 3,892,869, discloses a floating end closure formed within the shirred stick from a predetermined amount of casing material that has been inturned into the bore of the shirred stick and axially compressed. The resulting closure is asymmetrical relative to the stick bore.

In U.S. Pat. No. 4,075,938, the end closure is formed within the casing stick by first winding a deshirred portion of the casing to form a wall portion across the bore of the stick. The winding mechanism, including a rotating mandrel, is then advanced into the bore of the casing stick. This advances the wall portion into the bore while simultaneously winding deshirred casing on the rotation mandrel to form a generally cylindrically twisted or radially wound portion following the advancing wall portion.

A further, twisted, implanted closure is disclosed in U.S. Pat. No. 4,525,084. Here the winding mechanism is moved axially away from the end of the stick as it is rotated so that the casing material can be twisted between 20 and 30 revolutions without tearing the casing material. The twist closure of casing material formed by these rotations is then pushed axially to move it into the bore of the stick.

Other end closures formed within the shirred stick by crimping an end of the stick are shown in U.S. Patents to Matecki, U.S. Pat. Nos. 3,419,401; 3,550,191; 3,564,647; and 3,570,045. End closures formed outside the bore of the stick and subsequently implanted are shown in U.S. Pat. Nos. 3,942,568; 3,942,569; and 3,971,301.

One long-standing commercial problem with conventional shirred sticks having an end closure at one stick end, such as those described above, relates to air entrapped within the stick bore between the last-to-be-stuffed end of the shirred stick and the end closure implanted in the bore at the first-to-be-stuffed end of the stick. In some cases, during loading of these sticks onto a stuffing horn at the start of a stuffing operation, the entrapped air in the stick bore between the last-to-be-stuffed end of the stick and the end closure becomes compressed. This compressed air is the source of a variety of problems during the stuffing operation, ranging from blown end closures and bursting of the casing to an undersized first several links stuffed from the shirred stick.

A prior art solution to the above compressed air build-up problem involves the use of a "vented" end closure, i.e., an end closure having a hole in it to convey air out of the shirred stick. Although vented end closures solve the compressed air problem, vented closures sometimes cause another problem, namely, food product waste due to leakage out of the end closure vent.

Heretofore, there has been a long-felt need for avoiding or reducing the compressed air build-up problem without food product leakage and waste.

OBJECTS OF THE INVENTION

It is an object of the present invention to provide a shirred casing stick article having an end closure and a bore, with the end closure implanted anywhere in bore other than the first-to-be-stuffed end, wherein the stick bore volume between the last-to-be-stuffed end of the stick and the closure is controlled to be reduced or eliminated, as compared to the bore volume therebetween with the closure implanted at the first-to-be-stuffed end of the shirred stick.

It is another object of the invention to provide a method for making the above article.

This and other objects will become apparent upon a reading of the following detailed specification.

SUMMARY OF THE INVENTION

The present invention relates, in one aspect, to an improved shirred casing stick article having an end closure implanted in the bore of the stick. The improvement associated with the article of the present invention lies in the fact that the end closure is implanted at a position other than at the first-to-be-stuffed end of the shirred stick. When located in such a position, the stick bore volume between the last-to-be-stuffed end of the stick and the closure, is controlled to be reduced or eliminated as compared to the bore volume therebetween with the closure implanted at the first-to-be-stuffed end of the shirred stick. Such a bore volume reduction, between the last-to-be-stuffed end of the shirred stick and the closure, reduces or eliminates the volume of air entrapped therebetween during initial stuffing in a subsequent stuffing operation.

As used herein, the term "first-to-be-stuffed" end of the shirred stick denotes the end of the stick that is first to be deshirred during stuffing and the stick end that the food product last passes through during stuffing. The term "last-to-be-stuffed" end of the shirred stick denotes the end of the stick that is last to be deshirred during stuffing and the stick end that the food product first passes through during stuffing.

In another aspect, the invention relates to a method of making an end closure in situ at a position within the bore of a tubular shirred stick which comprises the steps of:

(a) providing a shirred casing stick having a stick bore and an unshirred portion of casing at a closable end of said stick;

(b) inserting the unshirred portion into the stick bore; and (c) closing the unshirred portion within the bore of said casing at a position other than at a first-to-be-stuffed end of the shirred stick.

In yet another aspect, the invention relates to a method for modifying a shirred casing stick article having a bore and an end closure which comprises:

(a) providing a shirred casing stick having a stick bore and an end closure in or outside of said bore at a first-to-be-stuffed end of the shirred stick;

(b) deshirring a length of casing adjacent said end closure; and (c) axially translating said end closure into the bore of said stick, a distance not greater than said stick length, to provide a shirred stick casing article with an end closure in the bore at a position other than at the first-to-be-stuffed end of the shirred stick. Alternatively, the end closure could be formed after the deshirring step (b) above or the deshirring step can be accomplished simultaneously with the axial translation.

BRIEF DESCRIPTION OF THE DRAWINGS

FIGS. 4 and 5 show, schematically and stepwise, a method of making an end closure in situ in the bore of the last-to-be-stuffed half of a casing stick using ram-stop means.

FIG. 5A shows schematically a method of making an end closure in situ with unrestricted axial movement capability within the bore of the casing.

FIG. 6 shows schematically a vented end closure in situ positioned in the bore at the last-to-be-stuffed end of the casing stick using ram-stop means.

DETAILED DESCRIPTION OF THE INVENTION

In one aspect of the article of the present invention, a shirred casing stick article mounted on a support tube having an end closure implanted in the support tube at a position other than at a first-to-be-stuffed end of the shirred stick is envisioned.

In a second aspect of the article of the invention, a shirred casing stick article having an end closure implanted in the stick bore at a position other than at an end of the shirred stick, is envisioned.

In a third aspect, a shirred casing stick article having an axially compressed end closure implanted in a last-to-be-stuffed end of the shirred stick is envisioned.

In the broadest aspect of the method of the present invention, an end closure for a shirred casing stick can be either made in situ, at a position other than at the first-to-be-stuffed end of the casing stick, or a formed end closure can be axially translated into the bore of thestick.

Figure 2:
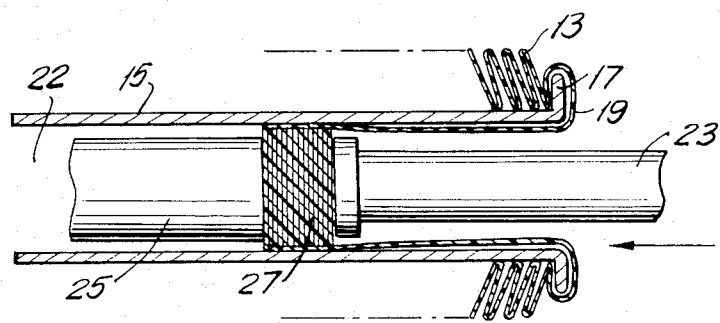
Figure 8:
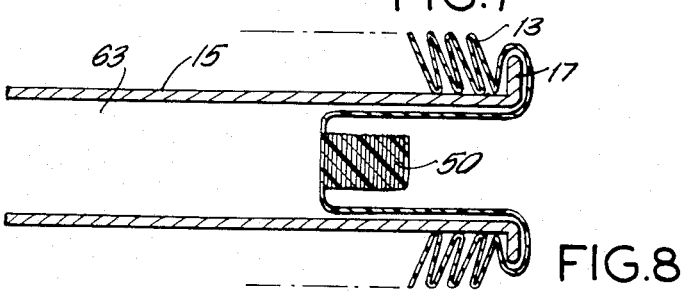

As used herein, the term "end closure" is intended to mean any plug of material, vented or non-vented, connected to casing material of the casing stick. The plug of material can be any material, e.g. collagen, plastics, cardboard and the like, including material identical to, or different from, the casing material itself. The end closure can be as simple as a string tied piece of casing or as complex as certain prior art end closures found in the referenced patents above. Depending upon the type of end closure used, the closure can be anchored within the stick as shown in FIG. 2 or loosely placed therein as shown in FIG. 8. It is further envisioned that the plug can be formed in situ within the casing stick simply by the force of meat emulsion pressure upon a length of unshirred casing inturned within the casing stick. The closure could alternatively be formed by closing the casing with metal clips, plastic ties, elastic bands, and the like.

In a preferred aspect, the present invention encompasses a method of making an end closure in situ at a position within the bore of a tubular shirred stick which comprises the steps of:

(a) providing a shirred casing stick having a stick bore and an unshirred portion of casing at a closable end of said stick;

(b) inserting the unshirred portion into the stick bore; and (c) providing compression means in the bore to axially compress said unshirred portion within the bore of said casing, to form an implanted and axially compressed end closure at a position other than at a first-to-be-stuffed end of the shirred stick.

In an alternate embodiment, the present invention emcompasses a method of making a hollow shirred stick tubular casing article having a bore and an end closure which comprises:

(a) providing a shirred casing stick having a stick bore and an unshirred length of casing at a closable end of said stick;

(b) providing a plug of casing or other material;

(c) attaching said plug to said unshirred length to form a casing end closure for the shirred casing stick;

(d) positioning said casing end closure within said bore at a position other than a first-to-be-stuffed end of the shirred casing stick.

Various methods for forming casing end closures are described in the above-discussed prior art patents and in my U.S. Pat. No. 4,551,370, incorporated herein by reference. Any of these methods can be used to form an end closure suitable for use in the article and method of the present invention. Thus the nature of the end closure itself is not critical to the present invention as long as it forms a plug in the casing. Rather, it is the location of the plug within the stick bore that is a critical aspect of the present invention.

Figure 1:
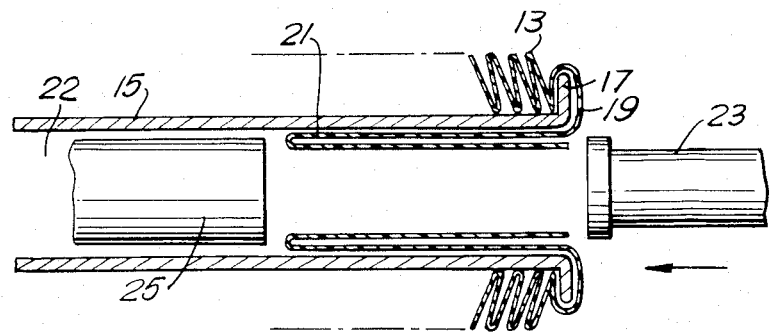
FIGS. 1 and 2 show, schematically and stepwise, one method of making an end closure in situ in accordance with the present invention using ram-stop means.

Referring to the Figures, FIG. 1 shows shirred casing stick 13 mounted on a tubular core or support tube 15. Support tube 15 can act as a stuffing horn during a subsequent stuffing operation. Support tube 15 terminates in flange 17. Stretched over and beyond flange 17 is unshirred casing length 19. Unshirred casing length 19 terminates in inturned casing length 21.

In accordance with the method depicted in FIG. 1, ram 23 is inserted into the bore of shirred stick 13 causing compression of inturned casing length 21 against stop 25 (see FIG. 2). FIG. 2 shows a plug 27 formed by compression of ram 23 against stop 25. Note that plug 27 is axially displaced a distance into the bore 22 of shirred stick 13. This distance of displacement provides a reduction in the bore volume from the last-to-be-stuffed end of casing stick 13 up to end closure 27 by an amount equal to the bore volume between end closure 27 and flange 17 (where flange 17 marks the first-to-be-stuffed end of shirred stick 13). This reduction in bore volume between the end closure and the last-to-be-stuffed end of the stick reduces or eliminates the volume of air entrapped therebetween during initial stuffing in a subsequent stuffing operation.

The support tube shown in FIGS. 1 and 2 is optional, and it should be appreciated that the end closure can be formed and implanted as described herein without the requirement of a support tube. However, the use of a support tube is preferred.

Shirred casing stick 13 can be a "cored high density" stick as described in copending U.S. application Ser. No. 363,851, incorporated herein by reference. A cored high density casing article comprises a support tube or tubular core with a shirred casing length mounted thereon and highly compacted on said core to a high pack ratio of at least about 100 and a packing efficiency of at least about 0.50. Such an article provides a casing having improved structural stability and strength, and it supplies additional stuffing length, as compared to conventional shirred sticks.

Figure 3:
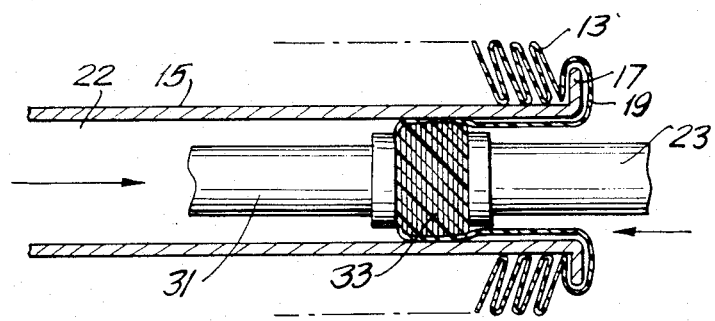
FIG. 3 shows, schematically a method of making an end closure in situ using ram-ram means.

FIG. 3 shows a method of in situ forming an end closure 33 following the method depicted in FIG. 1, but substituting ram 31 in place of stop 25 of FIG. 1, thereby forming end closure 33 by compression of inturned casing length 21 (FIG. 1) between ram 31 and ram 23.

FIGS. 4 and 5 show an alternate method of forming an end closure 37 (FIG. 5) in situ near the last-to-be-stuffed end 41 and away from the first-to-be-stuffed end 39 of shirred stick 13. This location of end closure 37 results from the substantial length of inturned casing length 21 within the bore of shirred stick 13. Note that ram 23 compresses inturned casing 21 against stop 25 to form end closure 37.

FIG. 6 shows the positioning of vented end closure 40 within the bore of shirred stick 13. By selecting a pre-determined length of inturned casing 21 that approximates the length of stick 13, end plug 38 having vent 40 may be positioned at the last-to-be-stuffed end of casing 41. Vented end closure 40 is shown being compressed within the bore of shirred stick 13 by the compression of ram 23 against stop 25. Vented end closure 40 can be made by known methods such as that disclosed in U.S. Pat. No. 4,070,729, incorporated herein by reference.

It is preferred that an end closure positioned at the last-to-be-stuffed end of the casing stick be an axially compressed end closure. As used herein, the term "axially compressed end closure" is intended to include compressed closures such as those disclosed in the Alsys U.S. Pat. No. 3,383,222 as well as twisted-knot closures such as those disclosed in the Tums patents referenced above, all incorporated herein by reference.

FIG. 5A shows a method of forming an end closure 36 in situ within the length of the support tube 15 where the end closure is formed having a diameter considerably smaller than the internal diameter of the support tube 15. This is accomplished by forming end closure 36 within a forming tube 34 positioned within the support tube 15. Forming tube 34 is subsequently withdrawn leaving end closure 36 loosely positioned within support tube 15. The end closure 36 has unrestricted axial movement capability within support tube 15 due to its smaller diameter relative to the diameter of support tube 15. A method of making a floating end closure disclosed in U.S. Pat. No. 3,892,869, incorporated herein by reference.

As stated above, the end closure of the present invention is implanted in the casing stick at a position other than the first-to-be-stuffed end of the stick, although the end closure can be implanted at the last-to-be-stuffed end of the stick. Preferably, it is implanted within a last-to-be-stuffed two-thirds of the stick, more preferably within the last-to-be-stuffed three-quarters of the stick, most preferably within the last-to-be-stuffed nine-tenths of the stick. The measurements of two-thirds, three-quarters and nine-tenths are made from the last-to-be-stuffed end of the stick as shown by the scale given in FIG. 5 with end closure 37 positioned at the two-thirds, three-quarters and nine-tenths break-off points, respectively, on the scale.

It is noted that compression of inturned casing length 21 by ram 23 against stop 25, as shown in FIG. 4, compresses a double layer of inturned casing length 21, whereas the compression shown in FIG. 1 will involve only a single layer of casing length 21. Combinations of ram-ram means or ram-stop means can be selected as desired for a particular application and end closure desired.

Figure 7:
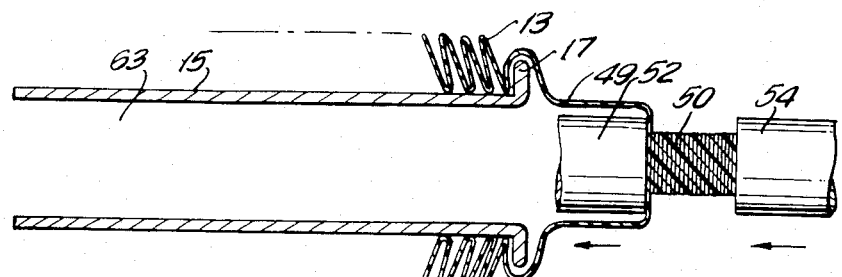
FIGS. 7 and 8 show, schematically and stepwise, a method of axially translating a formed end closure into the bore of a shirred stick.

FIGS. 7 and 8 show the axial capturing and translation of formed end closure 50 of shirred stick 13 into bore 63 of tubular core 15. FIG. 7 shows the use of rod 52 in combination with rod 54 to effect the capturing. FIG. 8 shows end closure 50 loosely placed after translation into bore 63.

Figure 9:
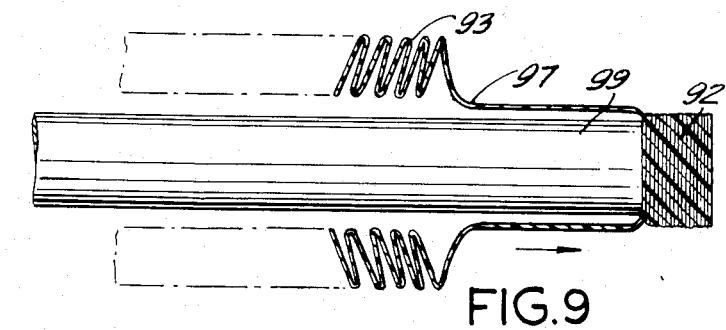
FIGS. 9 and 10 show, schematically and stepwise, another method for axially translating a formed end closure into the bore of a shirred stick.
Figure 10:
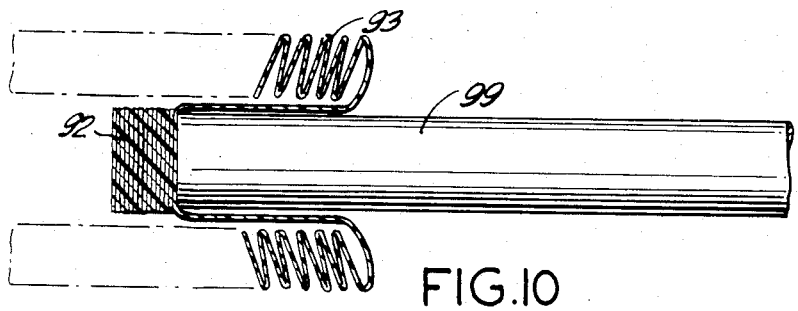

FIGS. 9 and 10 show a method of using ram 99 to first deshirr a length of casing 97 from an unsupported (no tubular core) shirred stick 93 (FIG. 9) and then, upon removal of ram 99 from the bore of shirred stick 93 and upon positioning of ram 99 on the outside of end closure 92, for axially translating plug 92 into the bore a distance equal to the length of deshirred casing 97.

The full scope of the present invention is not intended to be limited by the above detailed description of the invention. Suitable variations in the article and method described above would be readily apparent upon reading this specification and are meant to be encompassed by the claims hereinbelow.

For example, the shirred casing stick article having an end closure implanted deep within the stick bore may be supported upon a tubular core as shown in the Figures. In such embodiments, the end closure will be implanted within the bore of the support tube. In other embodiments, where no support tube is used, the end closure will be implanted deep within the bore of the unsupported shirred casing stick. Additionally, it must be noted that either unvented or vented end closures may also be implanted deep within the stick bore as illustrated. In addition, the Figures show the end closure positioned intermediate the ends of the casing stick. However, in one preferred embodiment, the end closure may be translated all the way from the first-to-be-stuffed end until it is positioned at the last-to-be-stuffed end and, in this case, it is preferred that the end closure be an axially compressed plug.

I claim:

1. A method of making a shirred casing stick having an implanted end closure which avoids air entrapment in the stick upon stuffing comprising the steps of:
   (a) providing a shirred casing stick having an axial bore which serves as a passageway for the food product to be stuffed, the bore having an outlet at a first-to-be-stuffed end of the stick which constitutes the end of the stick from which casing is first to deshirr during stuffing, and the bore having an inlet at the opposite and last-to-be-stuffed end of the stick which constitutes the end of the stick which is last to deshirr during stuffing;
   (b) extending an unshirred length of casing from the first-to-be-stuffed end of the stick;
   (c) forming a casing end closure by closing the extended end of the unshirred length; and
   (d) turning and inserting the unshirred casing length into the outlet of the stick bore and positioning the casing end closure inside the bore at a location which is within the last three-quarters of the length of the stick as measured from the bore inlet and the last-to-be-stuffed end, whereby air in the bore between the closure and the outlet is not subjected to entrapment at the onset of stuffing.

2. A method as in claim 1 wherein said step of forming a casing end closure is accomplished prior to said turning and inserting step by:
   (a) extending the unshirred length of casing outwardly from the stick and applying an end closure to the outwardly extended end of the unshirred casing length while maintaining the unshirred length extended from the first-to-be-stuffed end; and thereafter
   (b) turning and inserting the unshirred casing length and the end closure attached thereto into the inlet of the stick bore; and
   (c) continuing said turning and inserting until the end closure is positioned within the last three-quarters of the length of the stick as measured from the bore inlet end.

3. The method as in claim 1 wherein said step of forming a casing end closure is accomplished after said turning and inserting step by:
   (a) extending compression means axially into the stick bore from both the inlet and the outlet ends;
   (b) pressing a portion of the unshirred casing length between the compression means for axially compacting the portion of unshirred casing; and
   (c) continuing extending said compression means and pressing the portion of the unshirred casing length until the axially compacting of the portion of unshirred casing length forms an end closure implanted within the stick bore at a location which is within the last three-quarters of the length of the stick as measured from the bore inlet and the last-to-be-stuffed end.

4. The method as in claims 1, 2 or 3 including positioning the end closure inside the stick bore within the last two-thirds of the stick length as measured from the inlet end.

5. The method as in claims 1, 2 or 3 including positioning the end closure inside the stick bore at substantially the inlet end.

6. The method as in any of the claims 1, 2 or 3 including mounting the shirred stick on a hollow support tube and positioning the end closure within the hollow support tube.

* * * * *